(12) United States Patent
Miura et al.

(10) Patent No.: US 8,855,912 B2
(45) Date of Patent: Oct. 7, 2014

(54) TRAVEL ROUTE EVALUATION SYSTEM AND TRAVEL ROUTE EVALUATION PROGRAM

(75) Inventors: Naoki Miura, Toyokawa (JP); Yoshio Yamatani, Okazaki (JP); Hiroaki Sekiyama, Tokyo (JP); Shojiro Takeuchi, Tokyo (JP); Nobutaka Tauchi, Toyoake (JP); Satoshi Harumoto, Kobe (JP); Koei Kiyo, Kobe (JP)

(73) Assignees: Aisin Aw Co., Ltd., Anjo (JP); Denso Corporation, Kariya (JP); Fujitsu Ten Limited, Kobe (JP)

( * ) Notice: Subject to any disclaimer, the term of this patent is extended or adjusted under 35 U.S.C. 154(b) by 827 days.

(21) Appl. No.: 12/997,972

(22) PCT Filed: Aug. 20, 2009

(86) PCT No.: PCT/JP2009/065277
§ 371 (c)(1),
(2), (4) Date: Apr. 20, 2011

(87) PCT Pub. No.: WO2010/024449
PCT Pub. Date: Mar. 4, 2010

(65) Prior Publication Data
US 2011/0196601 A1    Aug. 11, 2011

(30) Foreign Application Priority Data

Aug. 28, 2008 (JP) .................. 2008-219890

(51) Int. Cl.
*G01C 21/00* (2006.01)
*G01C 21/34* (2006.01)
*G01C 21/26* (2006.01)
*G08G 1/0968* (2006.01)
*G01C 21/36* (2006.01)

(52) U.S. Cl.
CPC ............ *G01C 21/3469* (2013.01); *G01C 21/26* (2013.01); *G08G 1/096827* (2013.01); *G01C 21/36* (2013.01); *G01C 21/3611* (2013.01); *G01C 21/00* (2013.01); *G01C 21/3697* (2013.01)
USPC ............................ 701/400; 701/533; 701/534

(58) Field of Classification Search
CPC ........ G01C 21/26; G01C 21/36; G01C 21/00; G01C 21/3611; G08G 1/096827
USPC ............... 340/995.21, 988, 932, 993, 995.12, 340/995.13, 907; 701/533, 423, 428, 200, 701/532, 418, 117, 50, 450; 74/340; 180/337, 170; 359/687; 715/745, 758; 700/229
See application file for complete search history.

(56) References Cited

U.S. PATENT DOCUMENTS

| | | | |
|---|---|---|---|
| 6,438,490 B2* | 8/2002 | Ohta | 701/423 |
| 2003/0006914 A1* | 1/2003 | Todoriki et al. | 340/995 |
| 2003/0135325 A1 | 7/2003 | Schuessler | |
| 2004/0088106 A1* | 5/2004 | Omi | 701/200 |
| 2012/0038491 A1* | 2/2012 | Publicover | 340/932 |

FOREIGN PATENT DOCUMENTS

| | | |
|---|---|---|
| CN | 1800783 A | 7/2006 |
| CN | 101046393 A | 10/2007 |
| CN | 101231173 A | 7/2008 |
| JP | A-2-278116 | 11/1990 |
| JP | A-04-205499 | 7/1992 |
| JP | A-2000-2553 | 1/2000 |
| JP | A-2005-017052 | 1/2005 |
| JP | A-2005-157480 | 6/2005 |
| JP | A-2006-78326 | 3/2006 |
| JP | A-2006-267008 | 10/2006 |
| JP | A-2008-008840 | 1/2008 |
| JP | A-2008-175566 | 7/2008 |

OTHER PUBLICATIONS

Dec. 27, 2012 Chinese Search Report issued in Application No. 200980131084X with Translation.
International Search Report for International Patent Application No. PCT/JP2009/065277, mailed on Dec. 11, 2009.

Written Opinion for International Patent Application No. PCT/JP2009/065277, mailed on Dec. 11, 2009.
Japanese Patent Office, Notification of Reason(s) for Refusal mailed Jan. 31, 2013 in Japanese Patent Application No. 2008-219890 w/Partial English-language Translation.

* cited by examiner

*Primary Examiner* — Behrang Badii
(74) *Attorney, Agent, or Firm* — Oliff PLC

(57) ABSTRACT

A travel route evaluation system is provided which is capable of enhancing the driver's consciousness of traveling on the a recommended route, in order to improve a degree of attainment of purposes, such as suppression of a fuel consumption and shortening of a required time, that would be obtained by presenting the recommended route.

The system includes: a route setting unit for setting a recommended route from a departure point to a destination, based on traveling environment information associated with a traveling environment of a vehicle and map data, a ratio calculation unit for calculating a recommended route travel ratio which is a proportion of the recommended route in a traveled route on which the vehicle traveled; and an evaluation information acquisition unit for acquiring evaluation information based on the recommended route travel ratio.

14 Claims, 6 Drawing Sheets

*Fig.4*

| Road type | Correction coefficient |
|---|---|
| Express way | 0.5 |
| Major road | 0.8 |
| General road | 1.0 |
| Alley | 1.5 |

*Fig.5*

| Total point :<br>57,320 pt | Monthly ranking |
|---|---|
| Previously-obtained point :<br>85 pt | August 540th ↘<br>July 371st ↗<br>June 1023rd ↗ |
| Class : B | |
| By traveling on the recommended route, a fuel consumption can be suppressed. | |

52(51) — Total point / Previously-obtained point
55(51) — Monthly ranking
56(51) — Class
53(51) — By traveling on the recommended route, a fuel consumption can be suppressed.

| Recommended route travel ratio [%] | Advice comment |
|---|---|
| 100~80 | You have traveled on an eco-friendly route with less fuel consumption. |
| 79~1 | By traveling on the recommended route, a fuel consumption can be suppressed. |
| 0 | Please set a recommended route. |

TRAVEL ROUTE EVALUATION SYSTEM AND TRAVEL ROUTE EVALUATION PROGRAM

TECHNICAL FIELD

The present invention relates to a travel route evaluation system and a travel route evaluation program for evaluating whether or not a route on which a vehicle traveled was suitable.

BACKGROUND ART

To this date, there has been known a technique for presenting a suitable route to a destination to a vehicle driver, using a navigation device or the like. Moreover, there has been known a technique for presenting, for example, a route with a minimum required time, a route with a minimum traveling distance and a route with a minimum fuel consumption, as suitable route.

For instance, Patent Document 1 listed below discloses a technique regarding a fuel consumption information provision system which displays estimated fuel consumption information, i.e. information of predicted fuel amount consumed by traveling on a specific route searched by a navigation device. In this technique, in order to enhance the accuracy of the estimated fuel consumption information, actual fuel consumption information is collected at a central management device (center) from a plurality of vehicles, and based on the collected information, estimated fuel consumption information for each route is generated. The generated estimated fuel consumption information is provided to the navigation device and output. With this configuration, an option is presented to a vehicle driver to select a route with a fuel consumption expected to be the minimum.

In addition, Patent Document 2 listed below discloses a technique regarding a navigation device in which a route with a minimum fuel consumption is searched in accordance with a result of a fuel consumption simulation that uses various types of information, such as information of distance from a departure point to a destination, information of slope, information of load capacity, and congestion state of the road. Patent Document 3 listed below discloses a technique regarding a navigation system in which information associated with a fuel consumption or required time obtained by actual traveling of the vehicle are stored in a database, and based on this information, a route with a minimum fuel consumption, a route with a minimum required time and the like are searched.
Patent Document 1: JP2006-078326A
Patent Document 2: JP2000-002553A
Patent Document 3: JP02-278116A

DISCLOSURE OF THE INVENTION

Problem to be Solved by the Invention

In the techniques described above, for example, the vehicle driver can attain suppression of the fuel consumption by traveling on a route with a fuel consumption expected to be the minimum which is presented as a recommended route. With these conventional techniques, when the vehicle runs not on the recommended route initially set, a suitable route to the destination is automatically searched again in accordance with a position of the vehicle at the present time. Therefore, to this date, drivers rarely become conscious of an effect resulting from traveling on a route different from the recommended route initially set, and specifically, never know how much the fuel consumption has increased, or how much the required time has increased. Therefore, it has been difficult to greatly improve a degree of attainment of purposes that would be obtained by presenting the recommended route, such as suppression of a fuel consumption and shortening of a required time.

Therefore, it would be desirable to provide a travel route evaluation system capable of enhancing driver's consciousness of traveling on the recommended route, in order to improve the degree of attainment of the purposes, such as suppression of a fuel consumption and shortening of a required time, that would be obtained by presenting the recommended route, without suffering the above-described inconveniences.

Means to Solve the Problem

Accordingly, in one aspect of the present invention, the travel route evaluation system includes: a route setting unit for setting a recommended route from a departure point to a destination, based on traveling environment information associated with a traveling environment of a vehicle and map data; a ratio calculation unit for calculating a recommended route travel ratio which is a proportion of the recommended route in a traveled route on which the vehicle traveled; and an evaluation information acquisition unit for acquiring evaluation information based on the recommended route travel ratio.

According to this configuration, the evaluation information based on the recommended route travel ratio can be acquired, and thus the driver can be objectively informed of a driving status regarding to what degree the vehicle traveled on the recommended route, based on the evaluation information. Therefore, the driver's consciousness of traveling on the recommended route can be enhanced, and as a result, it becomes possible to improve the degree of attainment of the purpose that would be obtained by setting the recommended route, such as suppression of a fuel consumption, shortening of a required time, shortening of a traveling distance, and containment of cost (e.g. road toll).

It is preferable that the route setting unit sets a route with a fuel consumption expected to be the minimum as the recommended route, based on the traveling environment information and the map data.

According to this configuration, there can be obtained the evaluation information based on the recommended route travel ratio regarding the recommended route which is set as a route with a fuel consumption expected to be the minimum. Therefore, the driver can objectively confirm how the actually traveled route by own driving has affected on the fuel consumption, based on the evaluation information. Therefore, the driver's consciousness of suppressing a fuel consumption by traveling on the recommended route can be enhanced, and it becomes possible to improve the degree of attainment of the purpose that would be obtained by presenting the recommended route, such as suppression of a fuel consumption.

It is preferable that the traveling environment information includes at least one of: traffic information associated with a traffic state of the route; route characteristic information associated with characteristics of the route; and fuel consumption information associated with a fuel consumption when the vehicle travels on the route.

According to this configuration, a recommended route can be set using various types of information regarding the traveling environment of the vehicle, which may affect the fuel consumption of the vehicle. Therefore, a route with a fuel consumption expected to be the minimum can be appropriately set as a recommended route.

It is preferable that the recommended route travel ratio is a proportion of a distance of the recommended route in a distance of the traveled route.

According to this configuration, the recommended route travel ratio can be appropriately obtained, using the distance of the traveled route and the distance of the recommended route as indices.

Alternatively, when the map data includes road network data formed of a plurality of nodes each corresponding to an intersection and a plurality of links each corresponding to a road that connects the nodes, it is preferable that the recommended route travel ratio is a proportion of a link number of the recommended route in a link number of the traveled route, or a proportion of a node number of the recommended route in a node number of the traveled route.

According to this configuration, the recommended route travel ratio can be appropriately obtained, using the link number or node number of the traveled route and the link number or node number of the recommended route, as indices. In addition, according to this configuration, a degree of influence on the recommended route travel ratio in accordance with an easiness level of traveling on the recommended route can be corrected (i.e. replaced with a suitable degree), by utilizing the fact that the branching point number, link number and node number within a predetermined distance become smaller as the size of the road becomes larger. Specifically, a recommended route travel ratio which is relatively closer to a feeling of the driver can be obtained by lowering the degree of influence on the recommended route travel ratio, in the case of a route passing a relatively larger road with less branching points, with which traveling on the recommended route is easy, or by raising the degree of influence on the recommended route travel ratio, in the case of a route passing a relatively smaller road with more branching points, with which traveling is likely to become off the recommended route. It should be noted that, in the present application, the term "branching point" means a point on a road at which more than two traveling directions can be selected, and examples include what is called intersection.

It is preferable that the route setting unit further includes a function to set a return route to a point on the recommended route or to the destination, when a position of the vehicle is not on the recommended route, and a function to reset the recommended route in accordance with a change in traveling environment information, when the position of the vehicle is on the recommended route and the traveling environment information has changed, wherein the ratio calculation unit excludes the return route from the recommended route upon calculating the recommended route travel ratio.

According to this configuration, in the case where the vehicle travels on the return route which was set due to the operation by the driver to travel off the recommended route, the return route is not taken as a recommended route upon calculating the recommended route travel ratio. On the other hand, for example, in the case where the traveling environment information, such as traffic information, has changed during the traveling on the recommended route, the recommended route is set again in accordance with the change. In this case, even when the recommended route is different from the recommended route at the time of starting, the recommended route travel ratio is calculated while taking the changed route as the recommended route. Therefore, the recommended route travel ratio can be appropriately calculated while excluding the return route set for traveling off the recommended route.

It is preferable that the map data includes facility information corresponding to facilities, and when the vehicle stopped at a point having the facility information or vicinity thereof within a predetermined distance from the recommended route, the ratio calculation unit calculates the recommended route travel ratio without using a route between the point having the facility information or vicinity thereof and the recommended route, or using the route between the point having the facility information or vicinity thereof and the recommended route as a route on the recommended route.

According to this configuration, reduction in the recommended route travel ratio, which may be caused by drop-by of the vehicle at a facility in the vicinity of the recommended route, can be prevented. Accordingly, the driver is allowed to drive the vehicle off the recommended route to a certain degree for rational reasons, such as having meals or taking a rest, and as a result, an appropriate recommended route travel ratio can be calculated.

It is preferable that the ratio calculation unit calculates the recommended route travel ratio, during at least one of a period from turn-on to turn-off of the main power supply of the vehicle; and a period from turn-on of the main power supply of the vehicle to the present time.

According to this configuration, when the main power supply of the vehicle is turned on, regardless of whether or not the recommended route is set, the recommended route travel ratio is calculated, and the evaluation information based on the calculation is obtained. Therefore, when the recommended route is not set, the recommended route travel ratio becomes zero, and the contents of the evaluation information based on the ratio becomes poor. On the other hand, in order to obtain the evaluation information with excellent contents, the driver has to set the recommended route even for a destination familiar to the driver, and as a result, there is enhanced a percentage of traveling a route that attains the purpose by presenting the recommended route. With this configuration, it becomes possible to improve the degree of attainment of the purpose that would be obtained by presenting the recommended route, such as suppression of a fuel consumption.

It is preferable that the evaluation information acquisition unit acquires at least one of the followings as the evaluation information: point imparted in accordance with the recommended route travel ratio; advice comment with a content corresponding to the recommended route travel ratio; and graphic indication visually representing the recommended route travel ratio at the present time.

According to this configuration, the driver can be appropriately informed of the level of the evaluation in accordance with the recommended route travel ratio.

It is preferable that the system further include an information collection unit for collecting information related to the recommended route travel ratio, from a plurality of the vehicles, wherein based on information collected by the information collection unit, the evaluation information acquisition unit acquires at least one of the followings as the evaluation information: a rank of each vehicle in comparison with other vehicles in terms of the recommended route travel ratio; and a class of each vehicle conferred based on past recommended route travel ratio of that vehicle in comparison with other vehicles.

According to this configuration, in the case where the information related to the recommended route travel ratio is collected from a plurality of the vehicles, the contents of the evaluation information can include the evaluation based on the comparison with other vehicles. Therefore, the driver can be more appropriately informed of the contents of the evaluation in accordance with the recommended route travel ratio.

It is preferable that the recommended route travel ratio is obtained as a correction value in which the recommended route travel ratio is corrected in accordance with an easiness level of traveling on the recommended route, the easiness level being determined based on route characteristic information associated with characteristics of the route.

According to this configuration, there can be obtained a value of the recommended route travel ratio corrected in accordance with the easiness level of traveling on the recommended route. The easiness level of traveling on the recommended route becomes higher, for example in the following cases: the number of branching point of road that is included in the recommended route becomes smaller; the distinguishability from other routes becomes higher; and the driving operation becomes easier. The easiness level of traveling on the recommended route can be defined in accordance with, for example, the route characteristic information, such as types of the road forming the recommended route, width of the road, shape of the road, and a branching point number per unit distance of the road. Accordingly, for example, the correction can be made in such a manner that the recommended route travel ratio is affected less in the case of the route passing a relatively larger road having less branching points, with which traveling on the recommended route is easy, and to the contrary, the recommended route travel ratio is affected more in the case of the route passing a relatively smaller road having more branching points, with which traveling is likely to become off the recommended route. As a result, the corrected recommended route travel ratio can be made relatively closer to a feeling of the driver.

It is preferable that the travel route evaluation system includes an on-board terminal device mounted on the vehicle and a central management device capable of communicating with a plurality of the on-board terminal devices, wherein when the main power supply of the vehicle having the on-board terminal device mounted thereon is turned off, the on-board terminal device sends information related to the recommended route travel ratio from turn-on to turn-off of the main power supply to the central management device, and the central management device generates the evaluation information regarding each on-board terminal device based on the information related to the recommended route travel ratio received from a plurality of the on-board terminal devices.

According to this configuration, the information related to the recommended route travel ratio from an on-board terminal device mounted on each of a plurality of the vehicles is collected at the central management device, and based on the information related to the recommended route travel ratio regarding a plurality of the vehicles, the evaluation information for each on-board terminal device can be generated. Therefore, the evaluation information having appropriate contents based on the comparison between a plurality of the vehicles can be provided to each on-board terminal device. In addition, when the main power supply of the vehicle having the on-board terminal device mounted thereon is turned off, the information related to the recommended route travel ratio from turn-on to turn-off of the main power supply is sent to the central management device, and therefore, the information related to the recommended route travel ratio during turn-on of the main power supply of the vehicle can be collected at the central management device with less number of communication. Accordingly, it becomes possible to efficiently collect much information at the central management device, and to provide more appropriate evaluation information to each on-board terminal device.

The technical features of the travel route evaluation system according to the present invention having the above-mentioned configuration may be applicable to a travel route evaluation method or travel route evaluation program, and therefore the present invention is also directed to such method and program.

Accordingly, another aspect of the present invention is to provide the travel route evaluation program for implementing the following functions by a computer: a route setting function to set a recommended route from a departure point to a destination, based on traveling environment information associated with a traveling environment of a vehicle and map data; a ratio calculation function to calculate a recommended route travel ratio which is a proportion of the recommended route in a traveled route on which the vehicle traveled; and an evaluation information acquisition function to acquire evaluation information based on the recommended route travel ratio.

It is matter of course that, the travel route evaluation program also exerts the same operational effects as those of the travel route evaluation system described above, and further, some additional technical features described in preferable embodiments of the system can also be incorporated into the program.

BRIEF DESCRIPTION OF THE DRAWINGS

FIG. 4 is a table showing one example of correction coefficients used for correcting a recommended route travel ratio.

FIG. 5 illustrates a comprehensive evaluation screen that displays evaluation information acquired by an evaluation information acquisition unit.

DESCRIPTION OF EMBODIMENTS

Figure 1:
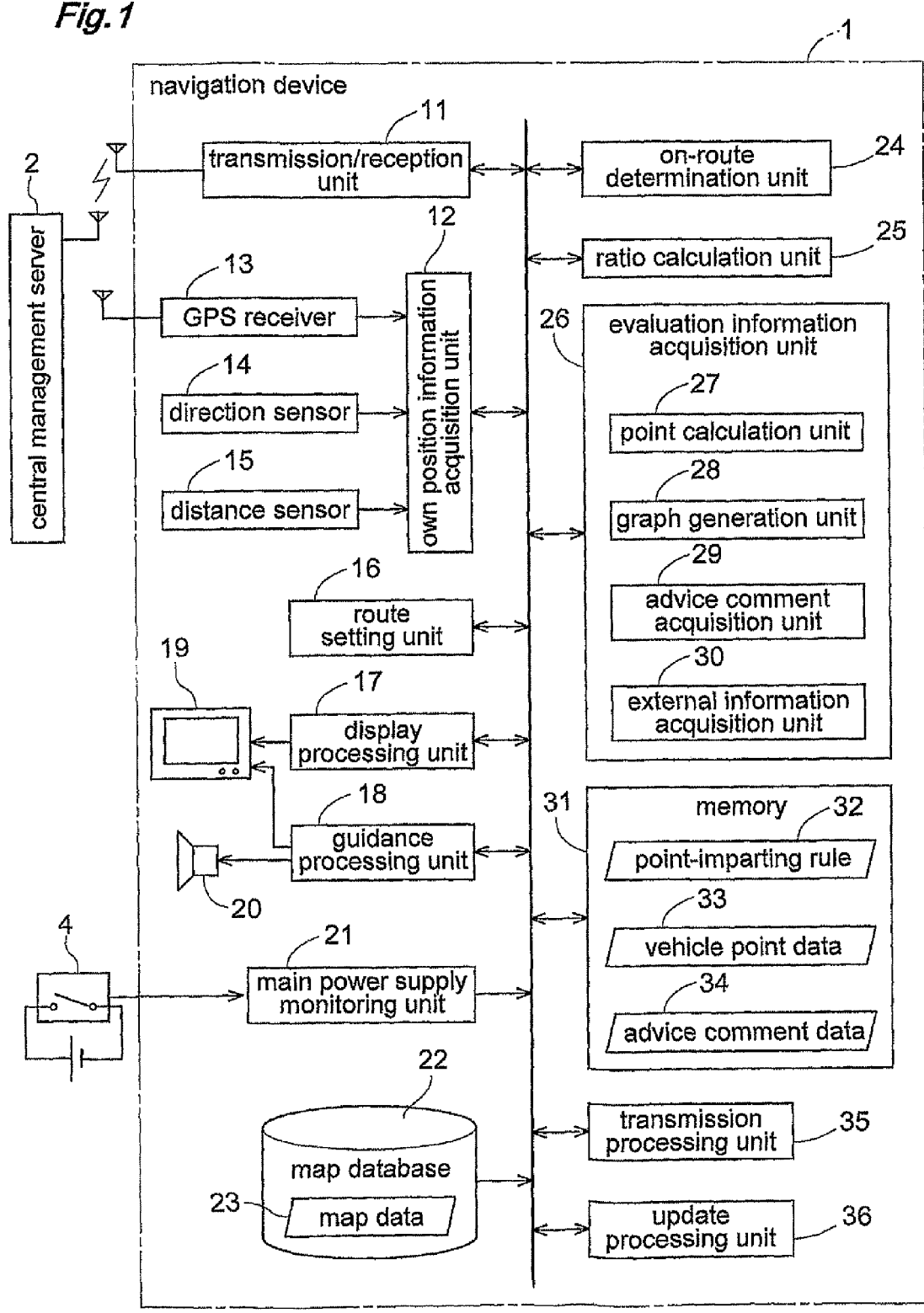
FIG. 1 is a block diagram showing a schematic configuration of a navigation device according to an embodiment of the present invention.

Embodiments of the present invention will be described with reference to the drawings. In the following description, a case is illustrated where the travel route evaluation system according to the present invention is formed of a navigation device 1 to be mounted on a vehicle 3 (see FIG. 2), and a central management server 2 capable of communicating with a plurality of the navigation devices 1. FIG. 1 is a block diagram showing a schematic configuration of the navigation device 1. The navigation device 1 as one component of the travel route evaluation system is configured to obtain and output evaluation information 51 (see FIGS. 5 and 6) based on a proportion of a recommended route A (see FIG. 3) in a traveled route on which the vehicle 3 traveled, the recommended route A to a destination G being set for various purposes, such as suppression of a fuel consumption, shortening of a required time, shortening of a traveling distance, containment of cost (e.g. road toll). The contents of the evaluation information 51 become excellent when a proportion of the recommended route A in a traveled route is higher. With this configuration, a driver of the vehicle 3 having the navigation device 1 mounted thereon can objectively confirm to what degree the vehicle 3 traveled on the recommended route A, based on the evaluation information 51. Therefore, the driver's consciousness of traveling on the recommended route A can be enhanced, and as a result, it becomes possible to improve the degree of attainment of the purpose that would be obtained by setting the recommended route A. In the present embodiment, a case is illustrated where the recommended route A is set for the purpose of suppressing a fuel consumption.

Figure 2:
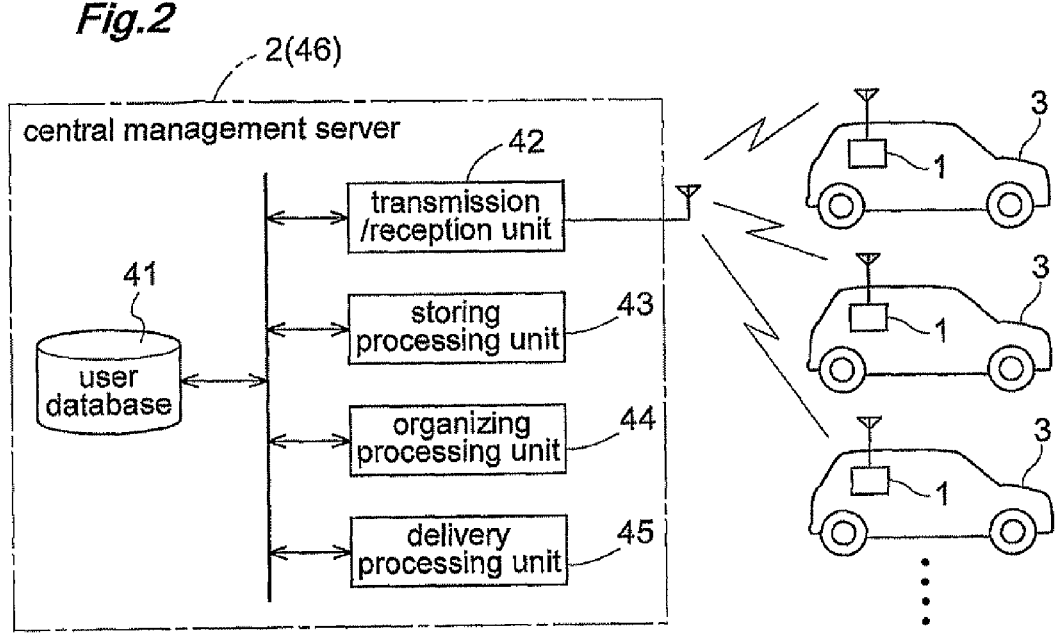
FIG. 2 is a block diagram showing a schematic configuration of a central management server according to an embodiment of the present invention.

FIG. 2 is a block diagram showing a schematic configuration of the central management server 2. The central management server 2 is configured to collect information from the navigation devices 1 mounted on the respective vehicles 3, generate the evaluation information 51 based on the collected information, and deliver the information to the navigation devices 1. In the present embodiment, the navigation device 1 corresponds to an on-board terminal device in the present invention, and the central management server 2 corresponds to a central management device or information collection unit 46 in the present invention.

1. Configuration of Navigation Device

First, the configuration of the navigation device 1 will be described. Each of functional units of the navigation device 1 shown in FIG. 1 for performing various processes with respect to input data is formed of hardware and/or software (program) installed in the navigation device 1, with a computing processor such as a central processing unit (CPU) as main member which is shared by the functional units or separately present for each functional unit. In the present embodiment, the navigation device 1 includes, as functional units, a transmission/reception unit 11, an own position information acquisition unit 12, a route setting unit 16, a display processing unit 17, a guidance processing unit 18, a main power supply monitoring unit 21, an on-route determination unit 24, a ratio calculation unit 25, an evaluation information acquisition unit 26, a transmission processing unit 35, and an update processing unit 36. These functional units are configured in such a manner that information can be transferred therebetween. When the functional unit is formed of software (program), the software is stored in a storage medium to which the computing processor can refer, such as RAM and ROM. A map database 22 includes, as a hardware configuration, a device having a rewritable storage medium, such as a hard disk drive, a flash memory, a DVD drive with a DVD-ROM, a CD drive with a CD-ROM. In addition, a memory 31 includes, as a hardware configuration, a device having a rewritable storage medium, such as a hard disk drive and a flash memory. When the map database 22 is formed of a rewritable storage medium, the memory 31 and the map database 22 may be provided in the same storage medium. The configuration of each component of the navigation device 1 according to the present embodiment will be described in detail below.

1-1. Map Database

Figure 3:
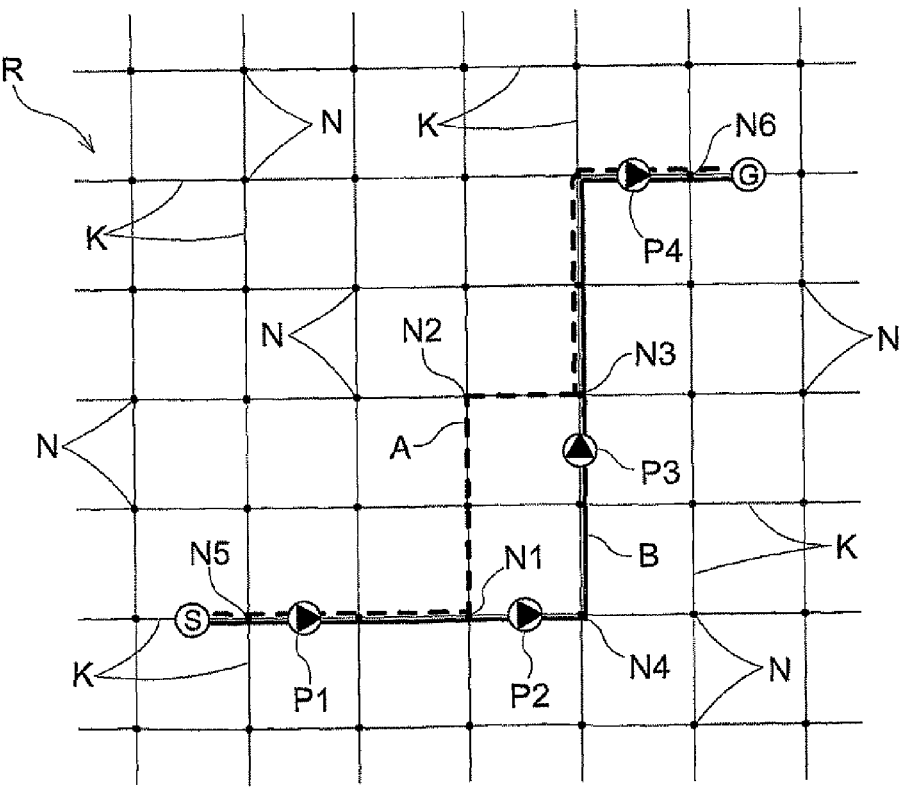
FIG. 3 is a diagram illustrating a recommended route and a traveled route from a departure point to a destination, both superimposed on road network data.

The map database 22 is a database in which map data 23 is stored. For example, the map data 23 includes, as shown in FIG. 3, road network data R formed of a plurality of nodes N each corresponding to an intersection, and a plurality of links K each corresponding to a road that connects two adjacent nodes N. In FIG. 3, the road network data R is illustrated which corresponds to roads and intersections arranged in a grid. In addition to the road network data R, the map data 23 also includes: graphic information required for map display processing by the display processing unit 17; various types of guidance information required for route guide processing by the guidance processing unit 18; and the like. Examples of the graphic information include background information required for displaying shapes of the roads, buildings, rivers and the like; and textual or character information required for displaying names of administrative districts, names of the roads and the like. Examples of the guidance information include intersection information composed of detailed information of intersections. The map data 23 further includes facility information to be used for searching facility and the like by a search processing unit (not shown). The facility information includes coordinate information indicating positions of facilities, as well as various types of attribution information, such as names, addresses, service types of the facilities.

1-2. Transmission/Reception Unit

The transmission/reception unit 11 is provided with a communication device configured to transmit and receive data with the central management server 2 by wireless communication through a wireless base station or the like. For the wireless communication, known communication networks, such as mobile phone network and wireless LAN (Local Area Network), can be used. In the present embodiment, the transmission/reception unit 11 is configured to transmit information related to a recommended route travel ratio to the central management server 2, as will be described later. In addition, the transmission/reception unit 11 is configured to receive the evaluation information 51, such as rank information 55 and the class information 56 obtained from a comparison with other vehicles 3 (see FIGS. 5 and 6), as well as update information for updating a rule for imparting point (point-imparting rule) 32 and advice comment data 34 stored in the memory 31 (these will be described later) from the central management server 2. The transmission/reception unit 11 is configured to also receive traffic information associated with traffic states of the routes, from the central management server 2. Examples of the traffic states represented by the traffic information include traffic congestion, traffic accident and traffic regulation. Examples of such traffic information include: probe communication traffic information generated by collecting and organizing the information, such as running conditions of the vehicles 3, received from the navigation devices 1 mounted on the respective vehicles 3; and statistical traffic information formed based on data of past traffic state.

In the present embodiment, the transmission/reception unit 11 is also provided with a receiving device configured to receive a signal from a transmitting device provided outside the vehicle 3 as a component of VICS (Vehicle Information and Communication System, registered trademark) and the like. Examples of the transmitting device include a radio beacon, an optical beacon, and an FM multiple broadcasting transmitter for VICS. The transmission/reception unit 11 is configured to receive the traffic information, such as traffic congestion information, from such a transmitting device.

1-3. Own Position Information Acquisition Unit

The own position information acquisition unit 12 is a functional unit configured to acquire an own position information which indicates a current position of the vehicle 3 (own vehicle) having the navigation device 1 mounted thereon. Herein, the own position information acquisition unit 12 is connected to a GPS receiver 13, a direction sensor 14 and a distance sensor 15. The GPS receiver 13 is a device configured to receive a GPS signal from a GPS (Global Positioning System) satellite. The GPS signal is typically received at intervals of 1 second, and is output to the own position information acquisition unit 12. The own position information acquisition unit 12 is configured to analyze the signal from the UPS satellite received by the GPS receiver 13, and to acquire information such as a current position (coordinate), a moving direction and a moving speed of the own vehicle. The direction sensor 14 is configured to detect a moving direction or change therein of the own vehicle. The direction sensor 14 is formed of, for example, a gyroscope, a geomagnetic sensor or the like. The direction sensor 14 is also configured to output the results of the detection to the own position information acquisition unit 12. The distance sensor 15 is configured to measure vehicle speed and travel distance of the own vehicle. The distance sensor 15 may be formed of, for example, a vehicle speed pulse sensor configured to output a pulse signal for every specific amount of rotation of a drive shaft, a wheel of the vehicle or the like; a yaw sensor and a gravity sensor configured to measure acceleration of the own vehicle; and a circuit configured to integrate the measured acceleration. The distance sensor 15 then outputs information of the vehicle speed and travel distance as the result of the detection, to the own position information acquisition unit 12.

The own position information acquisition unit 12 is configured to compute and specify an own vehicle position by a conventional method, based on these outputs from the GPS receiver 13, direction sensor 14 and distance sensor 15. The own position information acquisition unit 12 is also configured to perform a conventional map matching processing based on the map data 23 stored in the map database 22, to correct the own vehicle position so that the own vehicle is located on a road of the map data 23. A result of the correction of the own vehicle position by the map matching processing is reflected in the own position information. In this manner, the own position information acquisition unit 12 acquires the own position information including a current position of the own vehicle represented by a coordinate (latitude and longitude) and a moving direction of the own vehicle.

1-4. Route Setting Unit

The route setting unit 16 is a functional unit configured to search and set a recommended route A from a departure point S to a destination G, based on traveling environment information associated with a traveling environment of the vehicle 3, and also on the map data 23 stored in the map database 22 (see FIG. 3). In this case, various types of route can be searched and set by the route setting unit 16, such as a time priority route for the purpose of shortening a required time, a distance priority route for the purpose of shortening a traveling distance, and a cost priority route for the purpose of containing cost (e.g. road toll). In the present embodiment, as the recommended route A, the route setting unit 16 sets a fuel consumption priority route with which a fuel consumption is expected to be the minimum. Accordingly, when the driver drives the vehicle along the recommended route A, the fuel consumption of the vehicle 3 can be suppressed.

Herein, the traveling environment information includes the traffic information associated with traffic states of the routes, and route characteristic information associated with characteristics of the routes. The traffic information is obtained by the transmission/reception unit 11 from the central management server 2, VICS or the like. As described above, examples of the traffic information include traffic congestion information, traffic accident information and traffic regulation information. The route characteristic information is obtained by the route setting unit 16 from the map database 22. Examples of the route characteristic information includes: a route distance; a number of stop positions or possible stop positions in the route (such as stop sign and traffic light); a number of right turns and left turns; and shapes of the road, such as slope and curvature. These various kinds of information are stored in the map database 22 in association with the map data 23, or included in the map data 23. All these various types of information are properties of the route that may affect the fuel consumption of the vehicle 3.

The route setting unit 16 is configured to search and set the recommended route A with a fuel consumption expected to be the minimum, based on the traffic information and the route characteristic information. Specifically, the route setting unit 16 is configured to compute an expected level of the fuel consumption based on the traffic information (e.g. traffic congestion) and the various types of the route characteristic information for each of a plurality of routes connecting the departure point S with the destination G, and to select a route with a fuel consumption expected to be the minimum as the recommended route A. With respect to this computation, the fuel consumption is expected to become smaller in the following cases: the traffic congestion becomes smaller; the route becomes shorter; the number of stop signs, traffic lights or the like becomes smaller; the number of right turns and left turns or the like becomes smaller; an uphill slope becomes smaller; and a degree of the curvature becomes smaller.

FIG. 3 is a diagram illustrating the recommended route A and the traveled route B (on which the vehicle 3 actually traveled) from the departure point S to the destination G, both superimposed on the road network data R. In this drawing, the recommended route A is shown with a bold dotted line, and the traveled route B is shown with a bold solid line. In the present illustration, from the departure point S to the node N1, and from the node N3 to the destination G, the recommended route A matches the traveled route B, while from the node N1 to the node N3, the recommended route A and the traveled route B are different. In other words, the recommended route A is a route with a segment from the node N1 through the node N2 to the node N3, while the traveled route B is a route with a segment from the node N1 through the node N4 to the node N3.

The route setting unit 16 is also configured to search and set a return route to a point on the recommended route A or to the destination G, when a position of the vehicle 3 is not on the recommended route A. Herein, whether or not the position of the vehicle 3 is on the recommended route A is determined by the on-route determination unit 24 which will be described below. When the on-route determination unit 24 determined that the position of the vehicle 3 is not on the recommended route A, the route setting unit 16 searches a route for returning to the recommended route A based on the own position information at that moment as well as the map data 23, and sets the route as a return route. However, when a distance from the current position to the destination G without passing through the recommended route A is shorter than the distance with passing through the recommended route A, the route setting unit 16 sets a route to the destination G without passing through the recommended route A as a return route. With this configuration, even when the driver erroneously or intentionally drives the vehicle 3 off the recommended route A, the vehicle 3 can reach the destination G by referring to the displayed return route. In the case illustrated in FIG. 3, the vehicle 3 should have turned to the left at the node N1, in order to travel on the recommended route A, but the vehicle 3 ran straight at the node N1, and thus the vehicle 3 traveled off the recommended route A. Accordingly, the route setting unit 16 searched a return route at a position P2 where it was determined by the on-route determination unit 24 that the vehicle was not on the recommended route A, and the route setting unit 16 set a return route which turns to left at the node N4 and regains the recommended route A at the node N3. In this example, the driver drove the vehicle along the return route, and thus the resultant traveled route B became as shown in the diagram. It should be noted that the return route set in this manner is not included in the recommended route A, and accordingly, when the return route is included in the resultant traveled route, the traveling on the return route is not taken as traveling on the recommended A, upon calculating the recommended route travel ratio by the ratio calculation unit 25 (which will be described later).

In addition, the route setting unit 16 is also configured to reset the recommended route A in accordance with a change in the traveling environment information, when the position of the vehicle 3 is on the recommended route A and at the same time the traveling environment information has changed. As described above, the route setting unit 16 sets a route with a fuel consumption expected to be the minimum as the recommended route A, based on the traveling environment information including the traffic information and the route characteristic information. However, for example, when the traffic information, such as traffic congestion information, has changed, the route with the minimum fuel consumption may change accordingly. Therefore, when the traveling environment information, such as traffic information, has changed, the route setting unit 16 performs searching and setting of a recommended route A again, based on the changed traveling environment information. For example, when the transmission/reception unit 11 receives new traffic information, the recommended route A is searched again based on the new traffic information. In this case, the route setting unit 16 searches a route from a frontward point, in terms of a moving direction relative to a current position of the vehicle 3 indicated by the own position information, to the destination G. Even when the recommended route A becomes different from the route initially set, the re-searched new route is taken as the recommended route A, and the ratio calculation unit 25 calculates a recommended route travel ratio (which will be described later).

1-5. Display Processing Unit and Guidance Processing Unit

The display processing unit 17 is configured to generate various images required in the navigation device 1, such as: a map image based on the map data 23, around the vehicle 3 or around the position designated by the user, such as the destination G; a search screen for facilities or the like; and a setting screen for various changes in settings. The display processing unit 17 is also configured to perform processes, such as allowing a display and input device 19 to display the images, or switching the images in accordance with an input from the display and input device 19. The display processing unit 17 is further configured to allow the display and input device 19 to display the evaluation information 51 acquired by the evaluation information acquisition unit 26, as will be described below (see FIGS. 5 and 6). The guidance processing unit 18 is configured to provide a guidance to the driver along the recommended route A to the destination G set by the route setting unit 16 (see FIG. 3), by means of, for example, a guidance display by the display and input device 19 and an audio assist by an audio output device 20. The display and input device 19 is a device including a display device (such as liquid crystal display) and an input device (such as touch screen and operating switch), integrally formed together. The audio output device 20 includes a device for outputting audio, such as speaker and amplifier.

1-6. Main Power Supply Monitoring Unit

The main power supply monitoring unit 21 is configured to monitor a state of a main power switch 4 of the vehicle 3, and to determine the state of a main power supply as on-state when the main power switch 4 is turned on and a power is supplied to various parts of the vehicle 3, or to determine the state of the main power supply as off-state when the main power switch 4 is turned off and a power is not supplied to various parts of the vehicle 3. When the main power supply is in an on-state, the vehicle 3 becomes capable of running.

1-7. On-Route Determination Unit

The on-route determination unit 24 is a functional unit configured to determine whether or not the current position of the vehicle 3 is on the recommended route A set by the route setting unit 16. Herein, the on-route determination unit 24 determines whether the own vehicle position is on the recommended route A or on a route other than the recommended route A, based on the own position information acquired by the own position information acquisition unit 12, the map data 23 stored in the map database 22, and information of the recommended route A set by the route setting unit 16. In an embodiment shown in FIG. 3, when the position of the vehicle 3 is at P1 or P4, it is determined that the own vehicle position is on the recommended route A; when the position of the vehicle 3 is at P2 or P3, it is determined that the own vehicle position is not on the recommended route A. As will be described later, during a time period when the on-route determination unit 24 determines that the own vehicle position is on the recommended route A, the ratio calculation unit 25 calculates a recommended route travel ratio while the vehicle 3 is taken as running on the recommended route A; during a time period when the on-route determination unit 24 determines that the own vehicle position is not on the recommended route A, the ratio calculation unit 25 calculates a recommended route travel ratio while the vehicle 3 is not taken as running on the recommended route A.

1-8. Ratio Calculation Unit

The ratio calculation unit 25 is a functional unit configured to calculate a recommended route travel ratio which is a proportion of the recommended route A in a traveled route on which the vehicle 3 traveled. In the present embodiment, the ratio calculation unit 25 calculates a proportion of a total distance of the recommended route A on which the vehicle 3 actually traveled (recommended route traveling distance) in a distance of a traveled route B on which the vehicle actually traveled (entire traveling distance), as a recommended route travel ratio. Specifically, the ratio calculation unit 25 calculates the recommended route travel ratio based on the following equation (1):

$$\text{Recommended route travel ratio [\%]} = (\text{recommended route traveling distance})/(\text{entire traveling distance}) \times 100 \qquad (1)$$

Herein, the "entire traveling distance" as a denominator means a distance of the traveled route B on which the vehicle 3 actually traveled, and the "recommended route traveling distance" as a numerator means the distance of the recommended route A, or the sum of the distances of the segments of the recommended route A, on which the vehicle 3 actually traveled. Therefore, the recommended route travel ratio is calculated as a proportion of a distance of the recommended route A on which the vehicle 3 traveled in an entire distance of the traveled route B on which the vehicle 3 traveled. It should be noted that, the distance the vehicle 3 traveled may be obtained by the distance sensor 15, or may be obtained based on a track of the own vehicle position which is obtained by the own position information acquisition unit 12.

In FIG. 3, for example, assume that a length of each of the links K is 1 [km], a distance from the departure point S to a first node N5 is 500 [m], and a distance from the destination G to a node N6 located upstream is 500 [m]. In this case, an entire traveling distance from the departure point S to the destination G (distance of the traveled route B) is 9 [km], and the recommended route traveling distance (traveling distance on the recommended route A) for segments of the recommended route A that overlap with the traveled route B is 6 [km]. Accordingly, the recommended route travel ratio regarding the traveled route B from the departure point S to the destination G is obtained as 6/9×100=66.6[%].

The ratio calculation unit 25 can calculate a recommended route travel ratio regarding any traveled route B, not limited to the route from the departure point S to the destination G. In the present embodiment, the ratio calculation unit 25 calculates the recommended route travel ratios, from turn-on to turn-off of the main power supply, and from turn-on of the main power supply to the present time. Herein, the recommended route travel ratio from turn-on to turn-off of the main power supply corresponds to a recommended route travel ratio for a traveled route on which the vehicle 3 traveled from turn-on to turn-off of the main power supply, which is taken as one traveling unit as a whole; and the recommended route travel ratio from turn-on of the main power supply to the present time corresponds to a recommended route travel ratio for a traveled route on which the vehicle 3 traveled from turn-on to the present time, and depicts a recommended route travel ratio at the present time in the middle of one traveling unit as a whole.

The ratio calculation unit 25 is configured to calculate the recommended route travel ratio regardless of whether or not the recommended route A is set by the route setting unit 16. Therefore, when the recommended route A is not set at all from turn-on to turn-off of the main power supply of the vehicle 3, the recommended route travel ratio becomes zero. In addition, even when two types of traveling are present during traveling from turn-on to turn-off of the main power supply of the vehicle 3, including traveling with a setting of the recommended route A and traveling without a setting of the recommended route A, a proportion of the recommended route A in the traveling unit, which is a sum of two different types of traveling, is taken as a recommended route travel ratio. Therefore, when the destination is not set and thus the recommended route A is not set, the recommended route travel ratio becomes low, and the contents of the evaluation information 51 (see FIGS. 5 and 6) based on the ratio becomes poor. On the other hand, in order to obtain the evaluation information 51 with excellent contents, the driver has to set the recommended route A even for a destination G familiar to the driver, and by running along the recommended route A, a fuel consumption can be suppressed to reach the destination G.

In addition, in the present embodiment, the recommended route travel ratio calculated by the ratio calculation unit 25 can be obtained as a correction value, for which the correction was made in accordance with an easiness level of traveling on the recommended route A determined based on the route characteristic information, which is information associated with characteristics of the corresponding route. For example, the easiness level of traveling on the recommended route A becomes higher in the following cases: the number of branching point of the road that is included in the recommended route A becomes smaller; the link number and node number in the recommended route A become smaller; the distinguishability from other routes becomes higher; the driving operation becomes easier; and the like. Therefore, the easiness level of traveling on the recommended route A can be defined in accordance with, for example, the route characteristic information, such as types of the road forming the recommended route A, width of the road, shape of the road, a branching point number per unit distance of the road, and a link number and a node number per unit distance of the road. The route characteristic information can be obtained from the map database 22, as described above.

In the present embodiment, the ratio calculation unit 25 is configured to correct the recommended route travel ratio in accordance with the type of the road forming the traveled route B. Specifically, the ratio calculation unit 25 calculates the corrected recommended route travel ratio, in the above-mentioned equation (1) for calculating a recommended route travel ratio, by multiplying both "entire traveling distance" as a denominator and "recommended route traveling distance" as a numerator, by the corresponding correction coefficients established in advance in accordance with the road type. FIG. 4 is a table showing one example of correction coefficients in accordance with the road types. In this case, the correction coefficient is set smaller for a relatively larger road with less branching points, on which traveling is easy, and to the contrary, the correction coefficient is set larger for a relatively smaller road with more branching points, with which traveling is likely to become off the recommended route A. With this configuration, the correction can be made in such a manner that the recommended route travel ratio is affected less in the case of the route with which traveling on the recommended route A is easy, and to the contrary, the recommended route travel ratio is affected more in the case of the route with which traveling is likely to become off the recommended route A. As a result, the corrected recommended route travel ratio can be made relatively closer to a feeling of the driver.

It should be noted that, when the recommended route A is formed of a plurality of different road types, the ratio calculation unit 25 sums up the traveling distances for the respective road types, each of which is multiplied by a corresponding correction coefficient regarding the corresponding road type, to thereby obtain each of "entire traveling distance" as a denominator and "recommended route traveling distance" as a numerator in the equation (1). For example, assume that the vehicle traveled x1 [km] on an express way, x2 [km] on a general road, and x3 [km] on an alley as for a traveled route B, and traveled y1 [km] on the express way, y2 [km] on the general road, and y3 [km] on the alley as for the segments of the recommended route A which overlap the traveled route B, the recommended route travel ratio is calculated by the following equation (2):

Recommended route travel ratio [%]=(x1×0.5+x2× 1.0+x3×1.5)/(y1×0.5+y2×1.0+y3×1.5)×100  (2)

Hereinbelow, unless specifically explained, the simple expression "recommended route travel ratio" means a recommended route travel ratio after correction. However, with respect to the expression "recommended route travel ratio" used in the description below, it could of course mean a recommended route travel ratio calculated by the above-mentioned equation (1), used as-is without any correction.

1-9. Evaluation Information Acquisition Unit

Figures 6, 7:
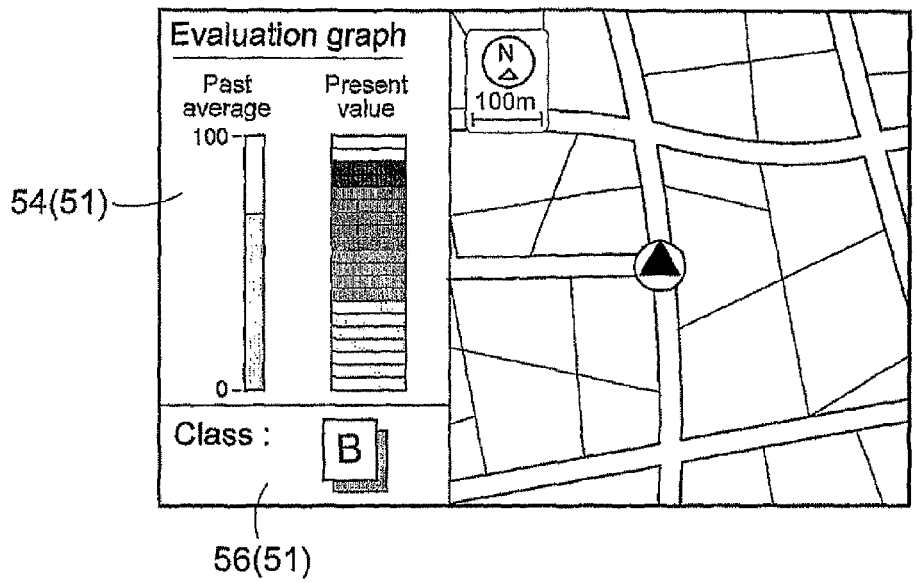
FIG. 6 illustrates a guide screen that displays evaluation graph information for sequentially showing a change in a recommended route travel ratio during traveling.
FIG. 7 illustrates advice comment data stored in a memory.

The evaluation information acquisition unit 26 is configured to acquire the evaluation information 51 based on the recommended route travel ratio calculated by the ratio calculation unit 25. Herein, as shown in FIG. 1, the evaluation information acquisition unit 26 includes a point calculation unit 27, a graph generation unit 28, an advice comment acquisition unit 29, and an external information acquisition unit 30. In addition, the evaluation information acquisition unit 26 is configured to acquire point information 52, advisory comment information 53, evaluation graph information 54, the rank information 55 and the class information 56, as the evaluation information 51. The memory 31 stores the point-imparting rule 32 and the advice comment data 34 to be referred to by the evaluation information acquisition unit 26. FIGS. 5 and 6 illustrates a screen in which the evaluation information 51 acquired by the evaluation information acquisition unit 26 is output and displayed at the display and input device 19. Herein, FIG. 5 illustrates a comprehensive evaluation screen that displays the results of the comprehensive evaluation of the past recommended route travel ratio, and FIG. 6 illustrates a guide screen that displays the evaluation graph information 54 for sequentially showing a change in the recommended route travel ratio during traveling of the vehicle 3. It should be noted that, in the embodiment show in FIG. 6, the class information 56 and a guide map for route guide are shown, in addition to the evaluation graph information 54.

The point calculation unit 27 is configured to calculate points to be imparted in accordance with the recommended route travel ratio. In this case, the point calculation unit 27 calculates points to be imparted, with reference to the point-imparting rule 32 stored in the memory 31. This point-imparting rule 32 is a rule that defines a relationship between the recommended route travel ratio calculated by the ratio calculation unit 25 and points to be imparted. In the present embodiment, as one example, the point-imparting rule 32 is defined to impart one point for every percentage point of the recommended route travel ratio. As described above, the ratio calculation unit 25 calculates the recommended route travel ratio between 0 and 100[%] for each traveling from turn-on to turn-off of the main power supply of the vehicle 3, and therefore, the point calculation unit 27 calculates and impart a point between 0 and 100 for each traveling, in accordance with the calculated recommended route travel ratio.

The point calculation unit 27 is also configured to cumulate points for a plurality of travelings, points for each traveling being calculated as described above, and to calculate the total point of obtained points up to the present time. The total point is cumulated every predetermined time period, such as every year, and when a new year starts the point is cumulated from the beginning again (the point is reset to zero), or alternatively, the cumulated point is processed into a cumulative value of all points obtained in the past. The point for each traveling and the total point, both calculated by the point calculation unit 27, are stored in the memory 31 as vehicle point data 33. Subsequently, based on the vehicle point data 33 stored in the memory 31, the point calculation unit 27 allows the display and input device 19 to display the point information 52 that indicates the point obtained in the previous traveling (previously-obtained point) and the total point. FIG. 5 illustrates such point information 52 shown on a part of the comprehensive evaluation screen.

The point-imparting rule 32 referred to by the point calculation unit 27 is updatable with update information received from the central management server 2. This update processing is performed by the update processing unit 36. Specifically, when receiving the update information of the point-imparting rule 32 through the transmission/reception unit 11 from the central management server 2, the update processing unit 36 updates the point-imparting rule 32 stored in the memory 31, based on the update information. With this configuration, for example, it becomes possible to change the rule as needed so that the imparted point becomes more appropriate value, and to change the rule so that the imparted point becomes larger during a certain limited time period. It should be noted that the above-mentioned content of the point-imparting rule 32 is merely an example, and any contents can be set. For example, it would be preferable that the point-imparting rule 32 is set so that the imparted point is changed in accordance with the moving distance of the vehicle 3 in one traveling, even for the same recommended route travel ratio.

The graph generation unit 28 is configured to generate a graphic indication visually representing the recommended route travel ratio at the present time. Specifically, as shown in FIG. 6, the graph generation unit 28 generates the evaluation graph information 54 for sequentially showing a change in the recommended route travel ratio during running of the vehicle 3. The graph generation unit 28 is also configured to allow the display and input device 19 to display the generated evaluation graph information 54. The evaluation graph information 54 includes a graph of the present value of the recommended route travel ratio and a graph of a past average of the recommended route travel ratios, which are arranged side by side for the purpose of comparison. Herein, the graph of the present value of the recommended route travel ratio is a graph for displaying the recommended route travel ratio regarding the traveled route on which the vehicle 3 traveled from turn-on of the main power supply to the present time, and the value is sequentially updated during the traveling of the vehicle 3. In addition, the graph for the past average of the recommended route travel ratios is a graph for displaying the average value of the past information of the recommended route travel ratio regarding the traveled route on which the vehicle traveled from turn-on to turn-off of the main power supply, and the value is updated every traveling of the vehicle 3. In the exemplified drawing, both graphs are represented as bar graph. It should be noted that the past information of the recommended route travel ratio may be stored in the navigation device 1, or in the central management server 2 as information for each vehicle 3.

The advice comment acquisition unit 29 is configured to acquire the advisory comment information 53 having contents in accordance with the recommended route travel ratio. Herein, the advice comment acquisition unit 29 is configured to read and acquire the advisory comment information 53 having contents in accordance with the recommended route travel ratio, from the advice comment data 34 stored in the memory 31. The advice comment acquisition unit 29 is also configured to allow the display and input device 19 to display the acquired advisory comment information 53. The advisory comment information 53 is text information for informing the driver of the contents of the evaluation in accordance with the recommended route travel ratio. In the present embodiment, this advisory comment information 53 is text information for enhancing the driver's consciousness of traveling on the recommended route A and thus for improving the degree of attainment of the fuel consumption suppression which is the object of presenting the recommended route A. FIG. 7 shows one example of the advice comment data 34 stored in the memory 31. According to this example, when the recommended route travel ratio is high, such as 100 to 80[%], a text with the complementary contents for attaining the high ratio is obtained as the advisory comment information 53, and when the recommended route travel ratio is relatively low, such as 79 to 1[%], a text with the recommendation contents for traveling on the recommended route A is obtained as the advisory comment information 53. When the recommended route travel ratio is 0[%], it is estimated that the vehicle 3 traveled without setting the destination G, and thus without setting the recommended route A. Accordingly, a text with the recommendation contents for setting the recommended route A is obtained as the advisory comment information 53. FIG. 5 illustrates the comprehensive evaluation screen that includes the advisory comment information 53.

The advice comment data 34 stored in the memory 31 is updatable with update information received from the central management server 2. This update processing is performed by the update processing unit 36. Specifically, when receiving the update information of the advice comment data 34 through the transmission/reception unit 11 from the central management server 2, the update processing unit 36 updates the advice comment data 34 stored in the memory 31, based on the update information. With this configuration, it becomes possible to change the contents as needed of the advisory comment information 53 into more appropriate one, for example, in accordance with the driving operation preference, driving history and the like of the driver. It should be noted that the above-mentioned content of the advice comment data 34 is merely an example, and any contents can be set.

The external information acquisition unit 30 is configured to perform processing for acquiring the evaluation information 51 from the central management server 2 provided outside the vehicle 3. Specifically, the external information acquisition unit 30 is configured to communicate through the transmission/reception unit 11 with the central management server 2 and receive the evaluation information 51, such as the rank information 55 and the class information 56, obtained from a comparison with other vehicles 3. As will be described later, the central management server 2 is configured to communicate with the navigation devices 1 mounted on the respective vehicles 3, and to collect information related to the recommended route travel ratio from the vehicles 3 and organize them (e.g., summing the values and arranging the values in order). In the present embodiment, the central management server 2 is configured to collect, from the navigation devices 1 of the respective vehicles 3, the information including: the point imparted in accordance with the recommended route travel ratio; and the entire traveling distance and the recommended route traveling distance which are the bases for calculating the recommended route travel ratio, to organize the information and to generate the rank information 55 and the class information 56. The external information acquisition unit 30 provided in each navigation device 1 requests the rank information 55 and the class information 56 generated in this manner from the central management server 2 at a predetermined timing and obtains the information. In the present embodiment, the external information acquisition unit 30 is configured to request the rank information 55 and the class information 56 from the central management server 2, when the main power supply of the vehicle 3 having the navigation device 1 mounted thereon is turned on.

The rank information 55 is information indicating a rank of each vehicle 3 with respect to the recommended route travel ratio in comparison with other vehicles 3. Examples of the rank information 55 include: information of a rank regarding the average value of the recommended route travel ratio for each vehicle 3 within a predetermined time period; and information of a rank regarding the total point obtained by each vehicle 3 within a predetermined time period. Herein, the predetermined time period is any time period arbitrarily set, such as one year, one month, one week, and one day. The external information acquisition unit 30 allows the display and input device 19 to display the acquired rank information 55. In the present embodiment, as illustrated in FIG. 5, the rank information 55 includes ranks for the total point obtained by each vehicle 3 for the shown month in comparison with other vehicles 3, and arrow images indicating the ups and downs of the rank as compared with the rank in the previous month.

The class information 56 is information indicating a class of each vehicle 3 conferred based on the past recommended route travel ratio of that vehicle in comparison with other vehicles 3. Examples of the class information 56 include information of a class in which each vehicle 3 falls into as a result of categorization of the vehicles 3 in accordance with: information of a rank regarding the average value of the recommended route travel ratio for each vehicle 3 within a predetermined time period; information of a rank regarding the total pint obtained by each vehicle 3 within a predetermined time period; and the total point acquired by each vehicle 3 up to the present time. In the present embodiment, the class information 56 is determined by shifting the class up and down, in accordance with the rank regarding the total point obtained within a predetermined time period (e.g. one year). As for the class, for example, categories of A, B, C, . . . or categories of 1, 2, 3, . . . , can be used. The external information acquisition unit 30 allows the display and input device 19 to display the obtained class information 56. In the present embodiment, as illustrated in FIG. 5, letters A, B, C, . . . are used for the class information 56, and the drawing illustrates the case where the vehicle 3 falls into the class "B".

1-10. Transmission Processing Unit

The transmission processing unit 35 is configured to send information related to the recommended route travel ratio to the central management server 2 at a predetermined timing. Specifically, when the main power supply of the vehicle 3 having the navigation device 1 mounted thereon is turned off, the transmission processing unit 35 sends information related to the recommended route travel ratio from turn-on to turn-off of the main power supply, to the central management server 2. Whether the main power supply is turned on or turned off is determined by the main power supply monitoring unit 21. In the present embodiment, the transmission processing unit 35 transmits, to the central management server 2, the information of the point of each traveling imparted in accordance with the recommended route travel ratio from turn-on to turn-off of the main power supply, and the information of the entire traveling distance and information of the recommended route traveling distance, which are the bases for calculating the recommended route travel ratio.

2. Configuration of Central Management Server

Next, the configuration of the central management server 2 will be described. As shown in FIG. 2, the central management server 2 is capable of communicating with navigation devices 1 mounted on the respective vehicles 3. The central management server 2 is configured to collect and organize the information related to the recommended route travel ratio from each navigation device 1, and to generate the evaluation information 51 for each navigation device 1, based on the organized information. The central management server 2 is also configured to deliver the generated evaluation information 51, in response to the request from each navigation device 1.

Each of functional units of the central management server 2 shown in FIG. 2 for performing various processes with respect to input data is formed of hardware and/or software (program) installed in the central management server 2, with a computing processor such as a central processing unit (CPU) as main member which is shared by the functional units or separately present for each functional unit. In the present embodiment, the central management server 2 includes, as functional units, a transmission/reception unit 42, a storing processing unit 43, an organizing processing unit 44, and a delivery processing unit 45. These functional units are configured in such a manner that information can be transferred therebetween. When the functional unit is formed of software (program), the software is stored in a storage medium to which the computing processor can refer, such as RAM and ROM. A user database 41 includes, as a hardware configuration, a device having a rewritable storage medium, such as a hard disk drive and a flash memory. The configuration of each component of the central management server 2 according to the present embodiment will be described in detail below.

2-1. Transmission/Reception Unit

The transmission/reception unit 42 is provided With a communication device configured to transmit and receive data with the navigation devices 1 mounted on the respective vehicles 3 by wireless communication through a wireless base station or the like. The wireless communication is similar to those of the transmission/reception unit 11 of the navigation device 1. As described above, in the present embodiment, the transmission/reception unit 42 is configured to receive, from the navigation device 1, the information related to the recommended route travel ratio, specifically, the information of the point imparted in accordance with the recommended route travel ratio, and the information of the entire traveling distance and information of the recommended route traveling distance, which are the bases for calculating the recommended route travel ratio. The transmission/reception unit 42 is also configured to send, to the navigation device 1, the evaluation information 51 based on the comparison with other vehicles 3, including the rank information 55, the class information 56, and the update information for updating the point-imparting rule 32 and the advice comment data 34 stored in the memory 31 of the navigation device 1.

2-2. Storing Processing Unit

The storing processing unit 43 is configured to sort information related to the recommended route travel ratio received using the transmission/reception unit 42 from the navigation devices 1 mounted on the respective vehicles 3, and to store the information in the user database 41 by each vehicle 3. As described above, in the present embodiment, the information related to the recommended route travel ratio includes the information of the point imparted in accordance with the recommended route travel ratio, and the information of the entire traveling distance and information of the recommended route traveling distance, which are the bases for calculating the recommended route travel ratio. Herein, the information of the point imparted in accordance with the recommended route travel ratio specifically is the information of the point of each traveling imparted in accordance with the recommended route travel ratio from turn-on to turn-off of the main power supply. In addition, the information of the entire traveling distance and the recommended route traveling distance is information regarding the distance of each traveling from turn-on to turn-off of the main power supply. These pieces of information are sent from the navigation device 1 of the vehicle 3 and received at the transmission/reception unit 42 as information of each traveling of that vehicle 3, when the main power supply is turned off in that vehicle 3. The storing processing unit 43 is configured to store the received information related to the recommended route travel ratio in the user database 41, in such a manner that the information is correlated with identification information and information of receiving date and time of each vehicle 3. Examples of the identification information of each vehicle 3 include an identification code of each vehicle 3 or of each navigation device 1, and a number on the license plate of each vehicle 3.

2-3. Organizing Processing Unit

The organizing processing unit 44 is configured to organize (e.g., sum and arrange) information related to the recommended route travel ratio stored in the user database 41 by each vehicle 3, and to generate the evaluation information 51 for each vehicle 3 (each navigation device 1). Specifically, the organizing processing unit 44 is configured to organize, at every predetermined time period, the information of the point of each traveling received from each vehicle 3, and to generate the rank information 55 indicating a rank for a total point in comparison with other vehicles 3. In the present embodiment, the organizing processing unit 44 is configured to calculate a total point obtained by each vehicle 3 per month, and to generate the rank information 55 indicating a rank in comparison with other vehicles 3. In addition, the organizing processing unit 44 is configured to organize the points obtained by each vehicle 3 within a predetermined time period, and to generate the class information 56 indicating a class imparted in accordance with the organized result. In the present embodiment, the organizing processing unit 44 is configured to determine the class of each vehicle 3, by shifting the class up and down in accordance with the rank regarding the total point obtained within a predetermined time period (e.g. one year), for example, raising the class when the rank is high, and lowering the class when the rank is low. It should be noted that, any class may be set as the initial class, such as the lowest class or an intermediate class, as the class before the first predetermined time period elapsed. The generated rank information 55 and the class information 56 are stored in the user database 41 in such a manner that they are correlated with the identification information of each vehicle 3.

The organizing processing unit 44 is also configured to cumulate information of the point of each traveling received from each vehicle 3, and to calculate the total point obtained in the past for each vehicle 3. As described above, the total point is defined as a cumulative value cumulated every predetermined time period, or alternatively, as a cumulative value of all points obtained in the past. The calculated total point information is stored in the user database 41 in such a manner that the information is correlated with the identification information of each vehicle 3. The total point information stored in the user database 41 in this manner is used as a backup or for confirmation of the total point information stored in the memory 31 of each navigation device 1. Therefore, this information essentially matches the total point information stored in the memory 31 as the vehicle point data 33 in the navigation device 1.

2-4. Delivery Processing Unit

The delivery processing unit 45 is configured to read, from the user database 41, the rank information 55 and the class information 56 generated as the evaluation information 51 by the organizing processing unit 44 in response to a request by the external information acquisition unit 30 of each navigation device 1, and to send them to the corresponding navigation device 1. In addition, the delivery processing unit 45 is configured to send the update information to the navigation device 1, when an update information generation unit (not shown) generates the update information for updating the point-imparting rule 32 and the advice comment data 34.

3. Procedure for Operational Processing

Figure 8:
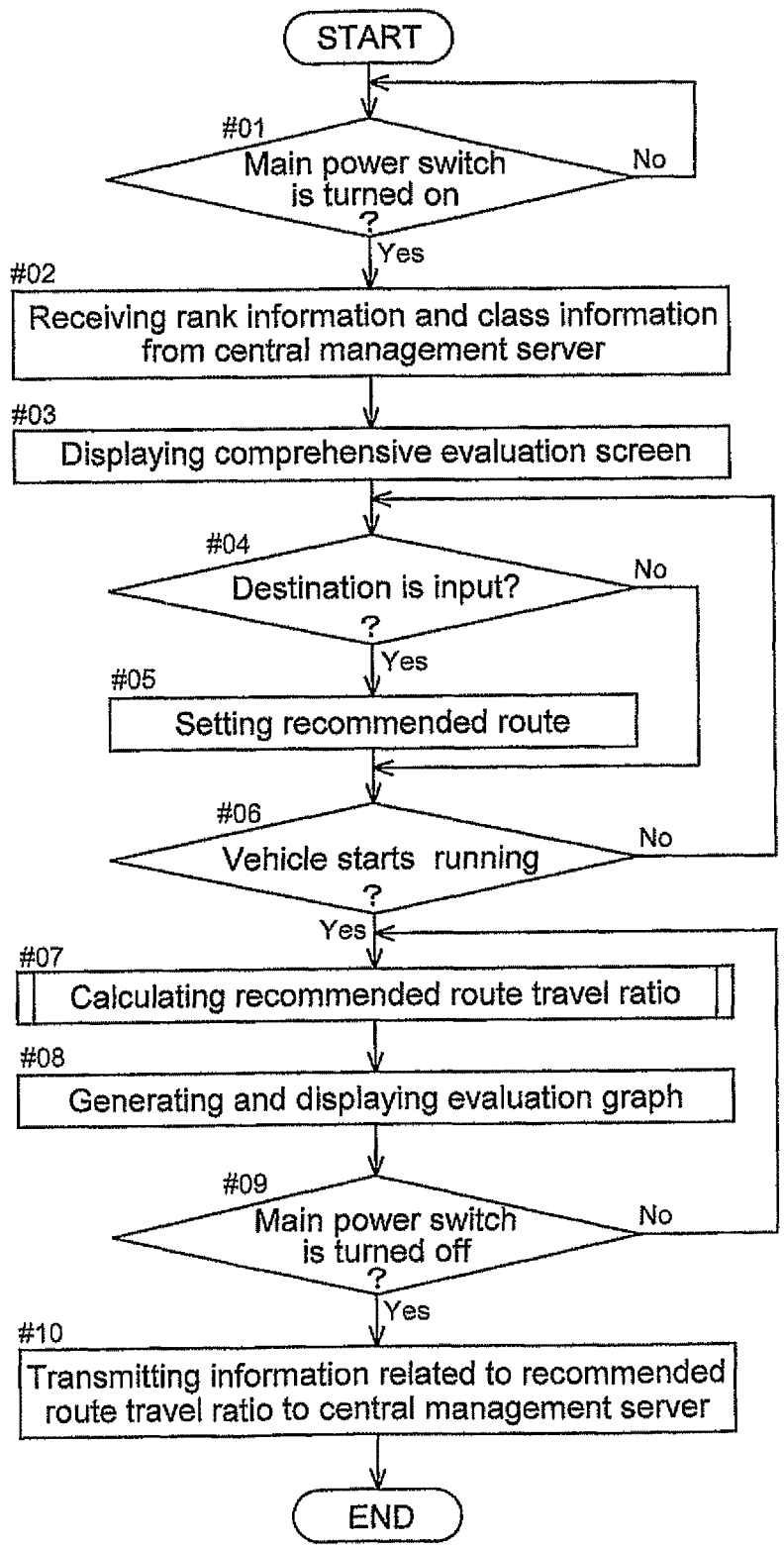
FIG. 8 is a flowchart showing an entire procedure for a travel route evaluation processing according to an embodiment of the present invention.
Figure 9:
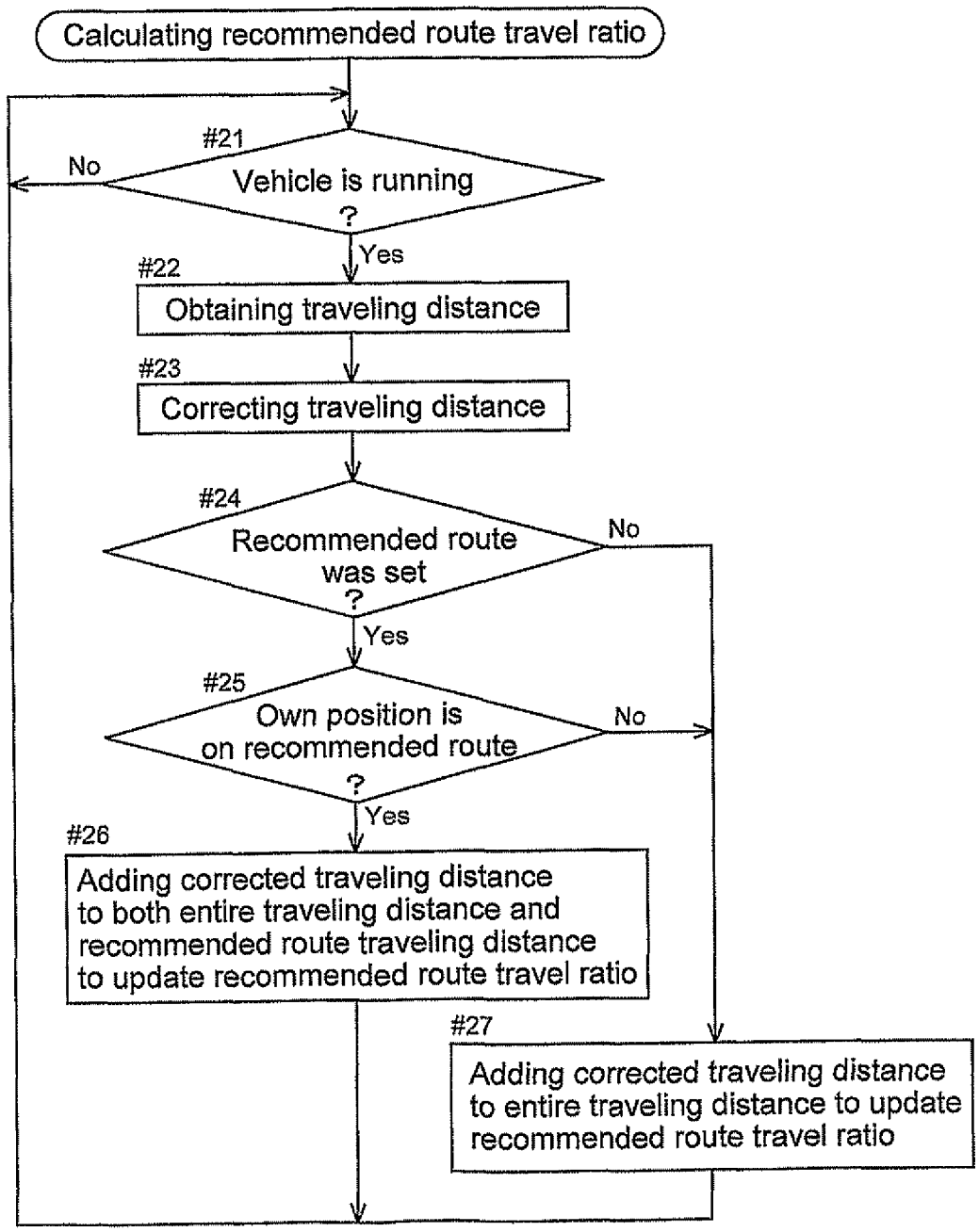
FIG. 9 is a flowchart showing a procedure for a recommended route travel ratio calculation processing in Step #07.

Next, a procedure for the travel route evaluation processing (travel route evaluation method) performed in the navigation device 1 according to the present embodiment will be described. FIG. 8 is a flowchart showing an entire procedure for the travel route evaluation processing according to the present embodiment. FIG. 9 is a flowchart showing a procedure for the recommended route travel ratio calculation processing in Step #07 of FIG. 8. The description will be made with reference to the flowchart.

3-1. Entire Procedure for Travel Route Evaluation Processing

First, the entire procedure for the travel route evaluation processing will be described. As shown in FIG. 8, when the main power switch 4 of the vehicle 3 having the navigation device 1 mounted thereon is turned on (Step #01: Yes), the external information acquisition unit 30 requests, from the central management server 2, the rank information 55 and the class information 56 as the evaluation information 51 of the corresponding vehicle 3, to thereby receive the relevant information (Step #02). Subsequently, the comprehensive evaluation screen is displayed (Step #03). The comprehensive evaluation screen includes, as shown in FIG. 5, the point information 52 indicating the point obtained in the previous traveling (previously-obtained point) and the total point, the advisory comment information 53, the rank information 55, and the class information 56. Herein, the point information 52 is calculated by the point calculation unit 27, and obtained from the vehicle point data 33 stored in the memory 31. The advisory comment information 53 is acquired by the advice comment acquisition unit 29 from the advice comment data 34 stored in the memory 31, by reading out the advisory comment information 53 having the contents corresponding to the recommended route travel ratio of the previous traveling (in the present embodiment, the same as the point obtained in the previous traveling). The rank information 55 and the class information 56 are obtained from the central management server 2 in Step #02. The comprehensive evaluation screen is formed of these pieces of information arranged in accordance with the predetermined format.

When the driver inputs the destination G (Step #04: Yes), the route setting unit 16 sets the recommended route A (see FIG. 3) (Step #05). After setting the recommended route A, the guidance processing unit 18 provides the guidance to the driver for traveling along the recommended route A. When the destination G is not input (Step #04: No), the procedure advances to Step #06. When the vehicle does not start running (Step #06: No), the procedure returns to Step #04.

When the vehicle 3 starts running (Step #06: Yes), the ratio calculation unit 25 calculates the recommended route travel ratio (Step #07). The recommended route travel ratio calculation processing will be described in detail later with reference to the flowchart of FIG. 9. Next, the graph generation unit 28 generates and displays the evaluation graph information 54 (Step #08). The evaluation graph information 54 is, as shown in FIG. 6, a graphic indication visually representing the recommended route travel ratio at the present time, including a graph of the prevent value of the recommended route travel ratio and a graph of the past average of the recommended route travel ratio. The processes of Steps #07 and #08 are repeated until the main power supply is turned off. Therefore, after the main power supply of the vehicle 3 is turned on and until the main power supply is turned off (Step #09:No), the recommended route travel ratio at the present time is continuously calculated, and at the same time, the evaluation graph information 54 indicating the recommended route travel ratio at the present time is displayed on the display and input device 19.

When the main power supply is turned off (Step #09: Yes), the transmission processing unit 35 sends information related to the recommended route travel ratio from turn-on to turn-off of the main power supply, to the central management server 2 (Step #10). Herein, as described above, the sent information related to the recommended route travel ratio includes the information of the point of each traveling, as well as the information of the entire traveling distance and information of the recommended route traveling distance, which are the bases for calculating the recommended route travel ratio. The information of the point of each traveling is the information of the point imparted in accordance with the recommended route travel ratio from turn-on to turn-off of the main power supply. In addition, the recommended route travel ratio from turn-on to turn-off of the main power supply is equal to the recommended route travel ratio calculated in Step #07 at a time point immediately before the main power supply is turned off. In this manner, the entire procedure of the travel route evaluation processing is terminated.

3-2. Procedure for Recommended Route Travel Ratio Calculation Processing

Next, the procedure for the recommended route travel ratio calculation processing in Step #07 of FIG. 8 will be described. As shown in FIG. 9, when the vehicle 3 having the navigation device 1 mounted thereon is running (Step #21: Yes), the traveling distance of the vehicle 3 is obtained by the distance sensor 15 or the like (Step #22). In this Step #22, the traveling distance is obtained at predetermined intervals. The traveling distance may be obtained in every unit time, obtained as a unit distance (obtained every time the vehicle traveled the unit distance), or obtained for the same type of the road (obtained when the continuous traveling on the same type of the road is completed). Next, the ratio calculation unit 25 corrects the traveling distance obtained in Step #22 (Step #23). Specifically, the corrected traveling distance is obtained by multiplying the traveling distance obtained in Step #22 by the correction coefficient in accordance with the road type (see FIG. 4). By using such a corrected traveling distance and calculating (updating) the recommended route travel ratio in Step #26 or #27 (which will be described later), the recommended route travel ratio is corrected in accordance with the types of the road that form the traveled route B.

Then, it is determined whether or not the recommended route A was set in Step #05 of FIG. 8 (Step #24). When the recommended route A was set (Step #24: Yes), next, it is determined by the on-route determination unit 24 whether or not the own vehicle position is on the recommended route A (Step #25). When the recommended route A is set (Step #24: Yes), and at the same time, when the own vehicle position is on the recommended route A (Step #25: Yes), the ratio calculation unit 25 adds the corresponding corrected traveling distances obtained in Step #23, to both the "entire traveling distance" as a denominator and the "recommended route traveling distance" as a numerator in the above-mentioned equation (1) for calculating a recommended route travel ratio, to thereby update the recommended route travel ratio (Step #26). On the other hand, when the recommended route A is not set (Step #24: No), or when the own vehicle position is not on the recommended route A (Step #25: No), the ratio calculation unit 25 adds the corresponding corrected traveling distance obtained in Step #23, only to the "entire traveling distance" as a denominator in the equation (1) for calculating the recommended route travel ratio, to thereby update the recommended route travel ratio (Step #27). It should be noted that, in Step #22, when the traveling distance is obtained for the first time after the main power supply of the vehicle 3 is turned on, the recommended route travel ratio is newly calculated in Step #26 or #27. Afterward, the procedure returns to Step #21, and every time the vehicle 3 travels and the traveling distance is obtained in Step #22, the recommended route travel ratio is updated, and the recommended route travel ratio at the present time is calculated.

4. Other Embodiments (1) In the embodiment above, the descriptions were made in the case where the route setting unit 16 sets the fuel consumption priority route with which a fuel consumption is expected to be the minimum as a recommended route. However, the present invention is not limited to this embodiment. For example, in one of preferable embodiments of the present invention, the route setting unit 16 may set a cost priority route for the purpose of containing cost (e.g. fuel expense and road toll) until reaching the destination G, a time priority route for the purpose of shortening a required time, a distance priority route for the purpose of shortening a traveling distance, and the like, as recommended route. In another preferable embodiment of the present invention, the route setting unit 16 may first search a plurality of routes with different purposes, and then a route selected by the driver from these routes, or a route with a predetermined purpose from these routes, may be set as the recommended route.

(2) In the embodiment above, the descriptions were made in the case where the route setting unit 16 searches and sets the recommended route with a fuel consumption expected to be the minimum, based on the traffic information and the route characteristic information. However, the present invention is not limited to this embodiment. For example, in one of preferable embodiments of the present invention, the route setting unit 16 may acquire fuel consumption information associated with a fuel consumption when the vehicle travels on each route, and search and set a recommended route with a fuel consumption expected to be the minimum based on this fuel consumption information. In another preferable embodiment of the present invention, the recommended route with a fuel consumption expected to be the minimum may be searched and set by using this fuel consumption information, together with one or both of the traffic information and the route characteristic information. Herein, for the fuel consumption information, statistical fuel consumption information generated in the central management server 2 by organizing actual fuel consumptions for a plurality of vehicles 3 that traveled their respective routes is suitably used. In this case, the route setting unit 16 obtains the fuel consumption information through the transmission/reception unit 11 from the central management server 2. In addition, as the fuel consumption information, estimated fuel consumption information may be used which is generated by the computation for estimating the level of the fuel consumption for each route, based on the traveling environment information, such as the traffic information and the route characteristic information. The estimated fuel consumption information may be obtained through the transmission/reception unit 11 from the central management server 2, or alternatively, may be stored in the database of the navigation device 1.

(3) In the embodiment above, the descriptions were made in the case where the route setting unit 16 uses the traffic information and the route characteristic information as the traveling environment information. However, the present invention is not limited to this embodiment. Other than the above-mentioned information associated with a traveling environment of the vehicle 3, the route setting unit 16 can use various types of information, such as climate, time-of-day, day of the week, season, type of the vehicle 3, year of manufacture of the vehicle 3, engine displacement, and tire pressure, as traveling environment information.

(4) In the embodiment above, the descriptions were made in the case where, when the vehicle 3 traveled on a route which is not on the recommended route A, the recommended route travel ratio is calculated, without exception, while the vehicle 3 is not taken as running on the recommended route A. In this case, even when the driver drives the vehicle off the recommended route to a small degree for rational reasons, such as having meals or taking a rest, an evaluation indicated by the evaluation information 51 is to become poor. Therefore, in one of preferable embodiments of the present invention, in order to prevent such an evaluation, by using facility information corresponding to facility included in the map data 23, the ratio calculation unit 25 may calculate the recommended route travel ratio without using a route between a point having the facility information or vicinity thereof and the recommended route A, when the vehicle 3 stopped at a point having the facility information or vicinity thereof within a predetermined distance from the recommended route A. In addition, in another preferable embodiment of the present invention, in such a case, the ratio calculation unit 25 may calculate the recommended route travel ratio using the route between the point having the facility information or vicinity thereof and the recommended route A as a route on the recommended route A. Herein, the predetermined distance may be of any set value, as long as the point at the predetermined distance does not deviate from the recommended route A to a large degree, and for example, a range of 100 [m] or 500 [m] from the recommended route A in both lateral directions is set as the predetermined distance from the recommended route A.

(5) In the embodiment above, the descriptions were made in the case where the ratio calculation unit 25 calculates the recommended route travel ratios from turn-on to turn-off of the main power supply of the vehicle 3, and from turn-on of the main power supply of the vehicle 3 to the present time. However, the present invention is not limited to this embodiment. For example, the ratio calculation unit 25 may calculate the recommended route travel ratio during a predetermined time period, which is included in a range from turn-on to turn-off of the main power supply of the vehicle 3. Therefore, in one of preferable embodiments of the present invention, the recommended route travel ratio may be calculated only when the recommended route A is set, or alternatively, only within a time period arbitrarily set by the driver.

(6) In the embodiment above, the descriptions were made in the case where the ratio calculation unit 25 calculates a proportion of a distance of the recommended route A in a distance of the traveled route B on which the vehicle 3 traveled, as a recommended route travel ratio. However, the present invention is not limited to this embodiment. Accordingly, like the embodiment above, in one of preferable embodiments of the present invention, when the map data 23 includes road network data formed of a plurality of nodes each corresponding to an intersection and a plurality of links each corresponding to a road that connects the nodes, such information of road network data may be used for calculating the recommended route travel ratio. With respect to this configuration, it is preferable that, for example, the ratio calculation unit 25 calculates a proportion of a link number of the recommended route A in a link number of the traveled route on which the vehicle 3 traveled, as the recommended route travel ratio. According to this configuration, in the case of FIG. 3, when the counting is made including the links on which the departure point S or the destination G is located, the number of links present on the traveled route B from the departure point S to the destination G is 10, among which the number of links present on the recommended route A is 7. Accordingly, the recommended route travel ratio regarding the traveled route B from the departure point S to the destination G is obtained as 7/10×100=70[%]. It should be noted that, when the counting is made excluding the links on which the departure point S or the destination G is located, the recommended route travel ratio is obtained as 5/8×100=62.5[%]. It is also preferable that the ratio calculation unit 25 calculates a proportion of a node number of the recommended route A in a node number of the traveled route on which the vehicle 3 traveled, as the recommended route travel ratio. According to this configuration, in the case of FIG. 3, the number of nodes present on the traveled route B from the departure point S to the destination G is 9, among which the number of nodes present on the recommended route A is 7. Accordingly, the recommended route travel ratio regarding traveled route B from the departure point S to the destination G is obtained as 7/9×100=77.8[%].

(7) In the embodiment above, the descriptions were made in the case where the ratio calculation unit 25 corrects the recommended route travel ratio in accordance with the types of the road that form the recommended route A. However, the present invention is not limited to those described above, and the recommended route travel ratio may be corrected in accordance with various indices that represent the easiness level of traveling on the recommended route A. For example, in one of preferable embodiments of the present invention, the recommended route travel ratio may be corrected in accordance with width of the road, shape of the road, branching point number per unit distance of the road or the like. In this case, it is preferable to use a correction coefficient established in advance in accordance with each index, like in the above-mentioned embodiment. It is also preferable that the recommended route travel ratio is corrected by combining a plurality of indices from among these. In this case, the corrected recommended route travel ratio can be calculated, in the equation (1) for obtaining the recommended route travel ratio, by multiplying both "entire traveling distance" as a denominator and "recommended route traveling distance" as a numerator, by the corresponding correction coefficients for all used indices. In addition, in another preferable embodiment of the present invention, a recommended route travel ratio may be corrected in accordance with a number of branching point present within a predetermined distance (e.g. 100 [km]) frontward in terms of a moving direction relative to the current position of the vehicle 3. In this case, it is preferable to use a correction coefficient established in advance in accordance with the number of branching point present within a predetermined distance from the vehicle 3.

(8) In the embodiment above, the descriptions were made in the case where the point information 52, the advisory comment information 53, the evaluation graph information 54, the rank information 55, and the class information 56 are obtained and output to notify the driver, as the evaluation information 51. However, the present invention is not limited to this embodiment. For example, in one of preferable embodiments of the present invention, only a limited type of information among these may be obtained as the evaluation information 51. In addition, it is preferable that other types of information representing the evaluation regarding the recommended route travel ratio than the above are included in the evaluation information 51.

(9) In the embodiment above, the descriptions were made in the case where the point calculation unit 27 provided in the navigation device 1 calculates the point for each traveling and the total point obtained in the past, and stores these points in the memory 31 of the navigation device 1. However, the present invention is not limited to this embodiment. For example, it is preferable that the information of the point of each traveling calculated by the point calculation unit 27 is sent to the central management server 2, and the central management server 2 calculates the total point for the corresponding vehicle 3, or alternatively, that the information of the recommended route travel ratio for each traveling is sent to the central management server 2, and the central management server 2 calculates the point for each traveling and the total point. In this case, the navigation device 1 obtains the information of the total point and the point for each traveling of the vehicle 3 at a predetermined timing, from the central management server 2 through the transmission/reception unit 11 using the external information acquisition unit 30.

(10) The arrangement of the functional units in the navigation device 1 and the central management server 2 described in the embodiment above is merely one example. Except the functional unit that is required to be provided in the navigation device 1, such as the own position information acquisition unit 12, the functional units may be provided in either the navigation device 1 or the central management server 2. Therefore, in one of preferable embodiments of the present invention, all essential features of the travel route evaluation system may be provided in the navigation device 1 as on-board terminal device. In this case, the travel route evaluation system is included in the navigation device 1. In another preferred embodiment of the present invention, all essential features of the travel route evaluation system may be provided in the central management server 2 as central management device. Herein, as the essential features of the travel route evaluation system include the route setting unit 16, the ratio calculation unit 25, and the evaluation information acquisition unit 26.

(11) In the embodiment above, the descriptions were made in the case where the on-board terminal device that forms travel route evaluation system according to the present invention is the navigation device 1. However, the present invention is not limited to this embodiment. For example, in one of the preferred embodiments of the present invention, the on-board terminal device forming the travel route evaluation system according to the present invention may be a control device of the vehicle 3 irrelevant to the navigation device 1.

INDUSTRIAL APPLICABILITY

The present invention is suitable for the use as a travel route evaluation system and a travel route evaluation program for evaluating whether or not a route on which a vehicle traveled was suitable,

DESCRIPTION OF THE REFERENCE NUMERALS

1: navigation device (on-board terminal device)
2: central management server (central management device)
3: vehicle
4: main power switch
16: route setting unit
23: map data
25: ratio calculation unit
26: evaluation information acquisition unit
46: information collection unit
51: evaluation information
52: point information
53: advisory comment information
54: evaluation graph information
55: rank information
56: class information
A: recommended route
B: traveled route
S: departure point
G: destination
R: road network data
N: node
K: link

The invention claimed is:

1. A travel route evaluation system comprising:
a route setting unit for setting a recommended route from a departure point to a destination, based on traveling environment information associated with a traveling environment of a vehicle and map data, the map data including facility information corresponding to facilities;
a ratio calculation unit for calculating a recommended route travel ratio which is a proportion of the recommended route in a traveled route on which the vehicle traveled, wherein when the vehicle stopped at a point having the facility information or vicinity thereof within a predetermined distance from the recommended route, the ratio calculation unit calculates the recommended route travel ratio without using a route between the point having the facility information or vicinity thereof and the recommended route, or using the route between the point having the facility information or vicinity thereof and the recommended route as a route on the recommended route; and
an evaluation information acquisition unit for acquiring evaluation information based on the recommended route travel ratio.

2. The travel route evaluation system according to claim 1, wherein:
the route setting unit sets a route with a fuel consumption expected to be the minimum as the recommended route, based on the traveling environment information and the map data.

3. The travel route evaluation system according to claim 2, wherein:
the traveling environment information comprises at least one of:
traffic information associated with a traffic state of the route;
route characteristic information associated with characteristics of the route; and
fuel consumption information associated with a fuel consumption when the vehicle travels on the route.

4. The travel route evaluation system according to claim 1, wherein:
the recommended route travel ratio is a proportion of a distance of the recommended route in a distance of the traveled route.

5. The travel route evaluation system according to claim 1, wherein:
the map data comprises road network data formed of a plurality of nodes each corresponding to an intersection and a plurality of links each corresponding to a road that connects the nodes; and
the recommended route travel ratio is a proportion of a link number of the recommended route in a link number of the traveled route, or a proportion of a node number of the recommended route in a node number of the traveled route.

6. The travel route evaluation system according to claim 1, wherein:
the route setting unit further comprises:
a function to set a return route to a point on the recommended route or to the destination, when a position of the vehicle is not on the recommended route; and
a function to reset the recommended route in accordance with a change in the traveling environment information, when the position of the vehicle is on the recommended route and the traveling environment information has changed; and
the ratio calculation unit excludes the return route from the recommended route upon calculating the recommended route travel ratio.

7. The travel route evaluation system according to claim 1, wherein:
the ratio calculation unit calculates the recommended route travel ratio, during at least one of:
a period from turn-on to turn-off of the main power supply of the vehicle; and
a period from turn-on of the main power supply of the vehicle to the present time.

8. The travel route evaluation system according to claim 1, wherein:
the evaluation information acquisition unit acquires at least one of the followings as the evaluation information:
point imparted in accordance with the recommended route travel ratio;
advice comment with a content corresponding to the recommended route travel ratio; and
graphic indication visually representing the recommended route travel ratio at the present time.

9. The travel route evaluation system according to claim 1, further comprising an information collection unit for collecting information related to the recommended route travel ratio, from a plurality of the vehicles;
wherein based on information collected by the information collection unit, the evaluation information acquisition unit acquires at least one of the followings as the evaluation information:
a rank of each vehicle in comparison with other vehicles in terms of the recommended route travel ratio; and
a class of each vehicle conferred based on past recommended route travel ratio of that vehicle in comparison with other vehicles.

10. The travel route evaluation system according to claim 1, wherein:
the recommended route travel ratio is obtained as a correction value in which the recommended route travel ratio is corrected in accordance with an easiness level of traveling on the recommended route, the easiness level being determined based on route characteristic information associated with characteristics of the route.

11. The travel route evaluation system according to claim 1, comprising an on-board terminal device mounted on the vehicle and a central management device capable of communicating with a plurality of the on-board terminal devices, wherein:
when the main power supply of the vehicle having the on-board terminal device mounted thereon is turned off, the on-board terminal device sends information related to the recommended route travel ratio from turn-on to turn-off of the main power supply to the central management device; and
the central management device generates the evaluation information regarding each on-board terminal device based on the information related to the recommended route travel ratio received from a plurality of the on-board terminal devices.

12. A non-transitory computer-readable storage medium storing a travel route evaluation program for implementing the following functions by a computer:
a route setting function to set a recommended route from a departure point to a destination, based on traveling environment information associated with a traveling environment of a vehicle and map data, the map data including facility information corresponding to facilities;

a ratio calculation function to calculate a recommended route travel ratio which is a proportion of the recommended route in a traveled route on which the vehicle traveled, wherein when the vehicle stopped at a point having the facility information or vicinity thereof within a predetermined distance from the recommended route, the ratio calculation unit calculates the recommended route travel ratio without using a route between the point having the facility information or vicinity thereof and the recommended route, or using the route between the point having the facility information or vicinity thereof and the recommended route as a route on the recommended route; and an evaluation information acquisition function to acquire evaluation information based on the recommended route travel ratio.

13. A travel route evaluation system comprising:
a memory storing a computer-executable program; and
a CPU that executes the stored program to:
  access stored map data and traveling environment information, the map data including facility information corresponding to facilities, and the traveling environment information being information related to events or road characteristics that affect driving efficiency;
  set a recommended route from a departure point to a destination based on the accessed map data and traveling environment information;
  calculate a recommended route travel ratio that indicates a proportion of the recommended route that has been traveled by the vehicle while traveling from the departure point to the destination, the recommended route travel ratio being calculated as a distance traveled by the vehicle along the recommended route divided by the total distance traveled by the vehicle since departing the departure point;
  when the vehicle stops at a facility that is within a predetermined distance from the recommended route, exclude a distance traveled from the recommended route to the facility from both (1) the distance traveled by the vehicle along the recommended route, and (2) the total distance traveled by the vehicle since departing the departure point when calculating the recommended route travel ratio;
  determine travel route evaluation information based on the calculated recommended route travel ratio; and
  communicate the determined travel route evaluation information to a user.

14. A non-transitory computer-readable storage medium storing a computer-executable travel route evaluation program, the program comprising:
  instructions for accessing stored map data and traveling environment information, the map data including facility information corresponding to facilities, and the traveling environment information being information related to events or road characteristics that affect driving efficiency;
  instructions for setting a recommended route from a departure point to a destination based on the accessed map data and traveling environment information;
  instructions for calculating a recommended route travel ratio that indicates a proportion of the recommended route that has been traveled by the vehicle while traveling from the departure point to the destination, the recommended route travel ratio being calculated as a distance traveled by the vehicle along the recommended route divided by the total distance traveled by the vehicle since departing the departure point;
  instructions for, when the vehicle stops at a facility that is within a predetermined distance from the recommended route, excluding a distance traveled from the recommended route to the facility from both (1) the distance traveled by the vehicle along the recommended route, and (2) the total distance traveled by the vehicle since departing the departure point when calculating the recommended route travel ratio; and
  instructions for determining travel route evaluation information based on the calculated recommended route travel ratio; and
  instructions for communicating the determined travel route evaluation information to a user.

* * * * *